United States Patent
Reynders et al.

(10) Patent No.: US 6,992,988 B2
(45) Date of Patent: Jan. 31, 2006

(54) SYSTEM AND METHOD FOR DEADLOCK-FREE ROUTING ON ARBITRARY NETWORK TOPOLOGIES

(75) Inventors: John V. Reynders, Newton, MA (US); Radia J. Perlman, Acton, MA (US); Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 860 days.

(21) Appl. No.: 09/933,317

(22) Filed: Aug. 20, 2001

(65) Prior Publication Data

US 2003/0043756 A1 Mar. 6, 2003

(51) Int. Cl.
 *H04L 12/26* (2006.01)
(52) U.S. Cl. ...... 370/255; 370/406
(58) Field of Classification Search ........ 370/254–256, 370/400, 406, 408
See application file for complete search history.

(56) References Cited

U.S. PATENT DOCUMENTS

| | | | | |
|---|---|---|---|---|
| 5,453,978 A | * | 9/1995 | Sethu et al. | 370/254 |
| 6,047,331 A | * | 4/2000 | Medard et al. | 709/239 |
| 6,631,421 B1 | * | 10/2003 | Steele et al. | 709/249 |
| 6,678,241 B1 | * | 1/2004 | Gai et al. | 370/216 |
| 6,765,880 B1 | * | 7/2004 | Hillard et al. | 370/255 |
| 2002/0042274 A1 | * | 4/2002 | Ades | 455/445 |
| 2002/0073338 A1 | * | 6/2002 | Burrows et al. | 713/201 |
| 2002/0141346 A1 | * | 10/2002 | Garcia-Luna-Aceves et al. | 370/238 |
| 2003/0140165 A1 | * | 7/2003 | Chiu et al. | 709/238 |
| 2003/0172180 A1 | * | 9/2003 | Reynders et al. | 709/238 |

* cited by examiner

*Primary Examiner*—Melvin Marcelo
(74) *Attorney, Agent, or Firm*—Kudirka & Jobse, LLP (57) ABSTRACT

A system and method for calculating a deadlock-free free set of paths in a network generates an ordered set of deadlock-free sub-topologies, referred to as "layers." The ordered set of layers is then used to determine a deadlock-free set of paths through the network by performing a shortest-path route calculation with the following constraint: starting at any given layer, for each node, proceed to calculate a shortest path to every other node in the graph where, at any node being utilized to assess a given minimum path, the path may move to any higher-ordered layer, but may not return to a lower-ordered layer.

51 Claims, 4 Drawing Sheets

*Fig. 8*

SYSTEM AND METHOD FOR DEADLOCK-FREE ROUTING ON ARBITRARY NETWORK TOPOLOGIES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to routing of data through a communications network, and more specifically to a system and method for calculating deadlock-free sets of paths for passing information over a communication network.

As it is generally known, routing is the process of determining the nodes through which a data unit is forwarded along its path between a source and a destination within a network. The route taken by data, such as a packet or other specific type of data unit, is also referred to herein as the path taken between the source and destination. Routing is performed by various kinds of data forwarding devices, including routers and switches. A forwarding device that performs routing is typically connected to multiple communication links, and operates to select at least one of those communication links as an output link for each received data unit to be forwarded. Thus it is seen that routing in general is concerned with determining which paths are used for forwarding data units through a network.

Traditional routing techniques have attempted to compute paths that do not contain loops. However, even where loop-free paths have been determined, traffic flows can interact with each other to cause a problem known as "deadlock" within the network. For example, deadlock can occur within a group of switches, each of which has buffers full of received data. Each of the switches in such a group may be unable to forward its received data because the switch to which that data must be forwarded has no available buffers to store the data.

Figure 1:
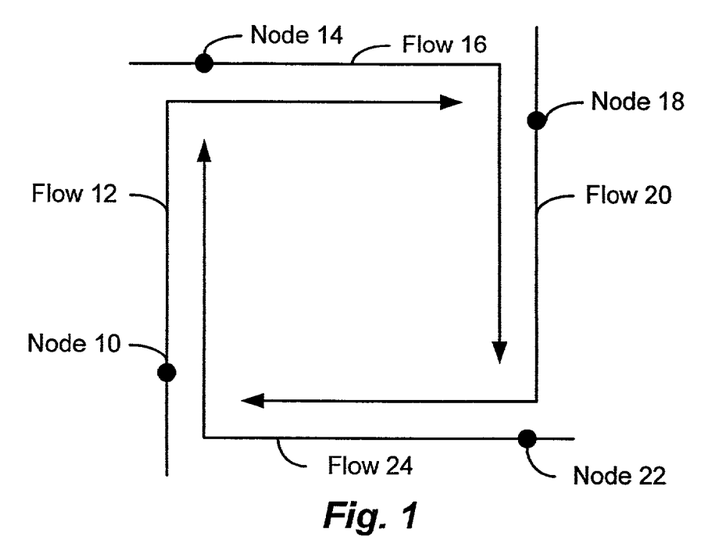
FIG. 1 illustrates a deadlock condition.

FIG. 1 illustrates the occurrence of deadlock in a group of four switches, referred to as nodes, within a communication network. The nodes 10, 14, 18 and 22 of FIG. 1 each include buffers for storing data, and may be interconnected using any conventional type of communication links or media. The data flows 12, 16, 20 and 24 consist of data units passed over such communication links between the nodes 10, 14, 18 and 22.

In the scenario illustrated in FIG. 1, node 10's buffers are filled with packets received from a data flow 12. However, node 10 cannot forward the packets it has received to node 14, since node 14's buffers are filled with packets from a data flow 16 that node 14 can't forward to node 18, since node 18's buffers are filled with packets from data flow 20. Similarly, node 18 cannot forward its data to node 22, since node 22's buffers are also filled. FIG. 1 thus illustrates how the occurrence of deadlock in a network can result in significant network performance problems.

Existing routing systems have been developed which provide deadlock-free sets of paths by either constraining the topology of the network itself, and/or by constraining the routes which may be taken through the network. For example, the topology of a network may be constrained such that the network topology is arranged as a grid. Given a grid topology, if all paths through the network are required to first traverse links horizontally as far as necessary, then vertically to the destination node, the network will be deadlock-free. Also, if the network topology is a tree, which by definition includes no loops, then the network will be deadlock-free during operation.

Existing systems have employed centralized techniques to compute deadlock-free sets of paths. A centralized approach operates such that one node obtains the complete topology of the network, for example by having each other node in the network report which neighbor nodes it is connected to. The central node then calculates a set of deadlock-free paths for the entire network. Once computed, these paths can then be distributed in the form of "forwarding tables" to all other nodes, thus informing each node in the network which neighbor node to forward a received data unit to, for each potential destination within the network.

One existing centralized approach to determining paths through a network is known as "up/down routing." In up/down routing, one of the nodes in the network is chosen arbitrarily as the root of a spanning tree for the network. All links within the network are then designated as "up" or "down" links with respect to the root node. The determination of an "up" or "down" state for a given link is based on the position of the link with respect to the spanning tree. A link is "up" if it points from a lower to a higher level node in the tree. Otherwise, the link is considered a "down" link. For nodes at the same level, node IDs are used to break the tie. Routing of packets from a source to a destination is performed such that any "up" links (towards the root) in the path are traversed before any "down" links are traversed (away from the root) in order to reach the destination. Accordingly, once a "down" link has been traversed, no "up" links may be used within that path. This approach prevents loops, and thus the routing is deadlock-free.

A significant problem with up/down routing is that links near the root of the spanning tree get congested and become bottlenecks leading to lower throughput. In other words, a disproportionate amount of traffic may be directed through links connected to the root node. Accordingly, it would be desirable to have a centralized system for deadlock-free path determination that provides for a more even distribution of traffic on the network during network operation.

BRIEF SUMMARY OF THE INVENTION

Consistent with principles of the present invention, a centralized system and method for calculating a deadlock-free set of paths are disclosed. The disclosed system generates an ordered set of deadlock-free sub-topologies, referred to as "layers." A deadlock-free sub-topology is a subgraph of the network (that is, a subset of the nodes plus a subset of the links, such that every link in the subgraph connects two nodes of the subgraph) along with a deadlock-free set of paths, such that the links used by the paths are in the subgraph. While a goal of the invention is to compute a deadlock-free set of paths for an entire network such that for every pair of nodes there is a path between those nodes in the set, the set of paths associated with a given sub-topology need not include a path for every pair of nodes in the sub-topology.

The disclosed system then uses this ordered set of layers to determine a deadlock-free set of paths through the network. The resulting paths allow data to be efficiently routed through the network without causing traffic to be disproportionately routed through any subset of links. The disclosed system considers the cost of each link when determining routing paths, where the cost of a link may represent the distance spanned by the link, or any other link attribute reflecting the expense of conveying data over the link. For example, the costs of each link in a network may be provided a priori by a system manager.

In an illustrative embodiment, for a given communications network having N nodes connected in an arbitrary topology, the disclosed system first generates a set of deadlock-free layers. Each of the deadlock-free layers may be any type of deadlock-free sub-topology. The disclosed system then operates to generate an ordering of the deadlock-free layers. The generated ordering may be any arbitrary ordering, and need not be the same order as the order in which the layers were created.

The disclosed system then performs a shortest-path route calculation with the following constraint: starting at any given layer, for each node, proceed to calculate a shortest path to every other node in the graph where at any node being utilized to assess a given minimum path, the path may move to any higher-ordered layer, but may never return to a lower ordered layer. In this way, within each layer, a path moves through a tree and thus avoids deadlock. Between layers, a path may move only in a single direction, thus also avoiding deadlock.

The disclosed system is applicable to network topologies including multiple links between nodes. In such a case, the disclosed system may operate to form deadlock-free layers using spanning trees across specific links until each link in the topology has been utilized. Moreover, the disclosed system may be applied to routing over virtual channels, operating to form layers including virtual channels until all virtual channels have been utilized.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

Figure 2:
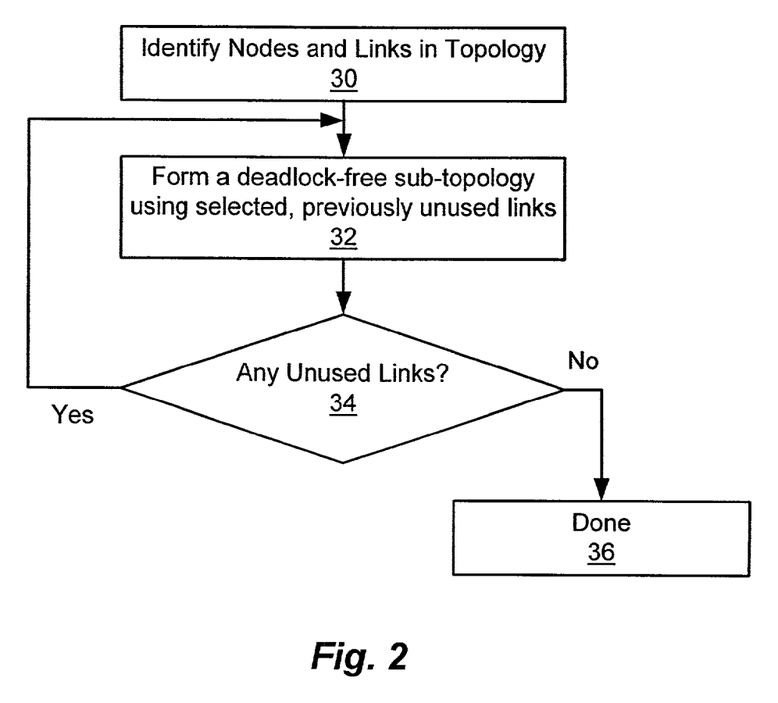
FIG. 2 is a flow chart showing steps performed in an illustrative embodiment to generate an ordered set of deadlock-free layers.

The disclosed system generates an ordered set of deadlock-free sub-topologies of a network in order to find a deadlock-free set of paths through the network. The deadlock-free sub-topologies generated by the disclosed system are referred to herein as "layers". As shown in FIG. 2, at step 30, the disclosed system first identifies those nodes and links that form the network to be processed. The nodes of the network may, for example, consist of various internetworking devices, such as those devices conventionally referred to as switches. The links of the network may consist of any type of communications link suitable for interconnecting the nodes of the network.

At step 32 of FIG. 2, the disclosed system forms a layer consisting of a deadlock-free sub-topology of the network being processed. The layer formed at step 32 may be any kind of deadlock-free sub-topology of the network. The links used to form a layer during step 32 are considered to be "used", and therefore unavailable for use in any other layer. Accordingly, each layer formed at step 32 consists of "unused" links with respect to any other layer.

Subsequent to step 32, at step 34, the disclosed system determines whether there are any links in the network that remain unused. If not, then step 34 is followed by step 36, since the system has completed formation of all layers. If so, then step 32 is repeated until each link in the network has been used within one layer. In the case where the network contains multiple links between nodes, the disclosed system may repeat steps 32 and 34 either until each link in the topology has been used within a layer, or until a predetermined number of layers have been formed. Similarly, where the network includes virtual channels over which paths may be established, then the disclosed system may repeat steps 32 and 34 either until all virtual channels have been used within the ordered set of layers, or until a predetermined number of layers have been formed.

The layers formed during step 32 may be spanning trees, or any other type of deadlock-free sub-topology of the network. Other specific types of deadlock-free sub-topologies may be employed, such as a sub-topology consisting of a number of paths determined using an up/down routing approach. The process of successively forming deadlock-free layers using unused links continues until either all possible deadlock-free layers have been formed, or until a predetermined number of deadlock-free layers have been formed. In one embodiment, when insufficient unused links remain to connect all nodes of the network, more layers may be formed consisting of deadlock-free sub-topologies that include as many of the remaining links as possible without forming any loops. Such non-spanning tree sub-topologies may be thought of as disconnected groups of trees, and are referred to herein as "forests".

The disclosed system may form a spanning tree as one or more of the layers in the ordered set of layers. Such a spanning tree may be formed using a conventional approach applied to those links available for use in any given layer. For example, Kruskal's algorithm may be applied to the remaining links at any layer in order to determine a spanning tree. As it is generally known, Kruskal's algorithm operates by maintaining a set of partial minimum spanning trees, and repeatedly adding the least costly, i.e. shortest, link in the network which connects nodes that are in different partial minimum spanning trees. A pseudo-random number generator may be used to break ties in the case of equal cost links. Other methods of obtaining spanning trees may be used in addition or in the alternative. For example, methods based on Prim's algorithm, which builds upon a single partial minimum spanning tree, at each step adding an edge connecting the vertex nearest to but not already in the current partial minimum spanning tree, may be used.

Following the steps shown in FIG. 2, the disclosed system determines an ordering for the layers that have been formed. The specific ordering of the layers may be determined in any way. For example, the ordering used may be based on the order in which the layers were formed, during the steps shown in FIG. 2. However, this is only one example of how an ordering may be provided to the set of deadlock-free layers, and any other arbitrary system of ordering may be provided in the alternative.

Figure 3:
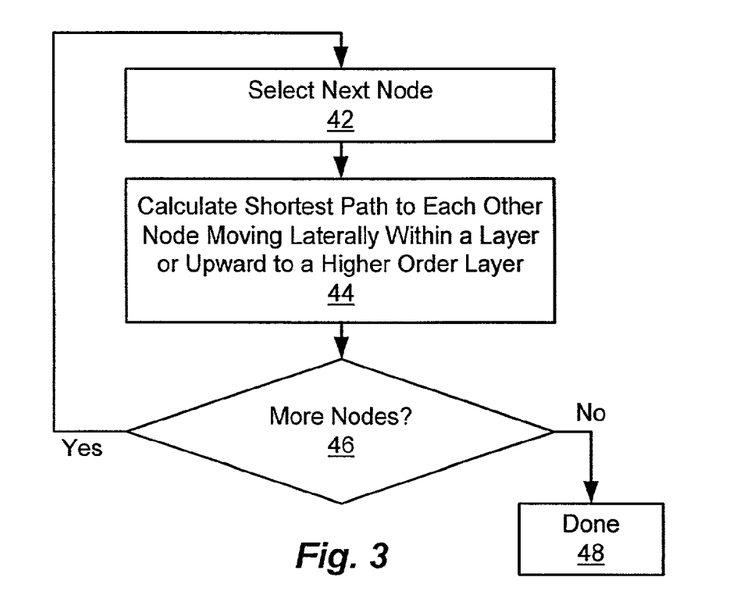
FIG. 3 is a flow chart showing steps performed in an illustrative embodiment to generate minimum cost paths through a network using an ordered set of deadlock-free layers.

The resulting ordered set of layers is then made available to a shortest-path route calculation process, as illustrated in FIG. 3. At step 42 of FIG. 3, a node is selected for processing that has not been previously processed by the steps shown in FIG. 3. At step 44, using the node selected at step 42, the disclosed system calculates a least costly (i.e. shortest) path to each other node in the network, considering both the cost of each link in each path, and the layer that each link is associated with in the ordered set of layers. In particular, during step 44, the disclosed system operates such that at any node being utilized to assess a minimum path, the path may move to any higher-ordered layer, but may never return to a lower ordered layer. In this way, within each layer of calculation, a path moves through a tree and thus avoids deadlock. Additionally, a path may only move in a single direction between layers, thus also avoiding deadlock. For any given node, traversal of the ordered set of layers in this fashion may begin at any layer, and then proceed in order through the ordered set of layers.

Accordingly, as described above, the shortest path determination performed by the disclosed system using the ordered set of layers may be provided in connection with what is generally referred to as an all-pairs path calculation. As it is generally known, an all-pairs determination operates to find the length of the shortest paths between all pairs of nodes in a network in which each link is associated with a cost. Moreover, the disclosed system may be implemented as a modification to a system which employs Dykstra's algorithm, which operates to find the shortest paths from a single source node to all other nodes in a network.

An embodiment of the disclosed system to calculate the all-pairs shortest paths is now explained in the context of a bottom-up all-pairs path calculation. For each layer L in the ordered set of layers, an adjacency matrix, w(L,i,j) is employed. An entry in the adjacency matrix w has a value of 1 where a link exists between two nodes, i and j, at a layer L, and has a value zero where there is no such link. Further in the illustrative embodiment, the disclosed system determines for each layer L a distance array d(L,i,j). An entry in the distance array d contains the distance between nodes i and j, where only layers less than or equal to L have been utilized to traverse a path between nodes i and j. Each entry d(L,i,j) is initialized with an infinite value if i is not equal to j, and starts out with a value of 0 when i is equal to j. A temporary matrix dp(L,i,j) is initialized at the beginning of each iteration to infinity, and after each iteration is copied into d. The illustrative embodiment then operates to loop through the nodes in the network as indicated by the pseudo-code below:

```
for( int i = 0; 1 < N; i++) {// N is the number of nodes
    for( int j = 0; j < N ; j++) {
        for( int L1 = 0; L1 < Layers-1; L1++) {
            // only check the next layer up
            // can also check every layer above for better
            // paths - at more cost
```

-continued

```
            for ( int k = 0; k < N; k++) {
                int test = dp(L1, i, k) + w(L1, k, j);
                if( test < dp(L1, i, j) ) {
                    dp(L1, i, j) = test;
                    dp(L1, j, i) = test;
                }
                test = d(L1, i, k) + w(L1+1, k, j);
                if( test < dp(L1+1, i, j) ) {
                    dp(L1+1, i, j) = test;
                    dp(L1+1, j, i) = test;
                }
            }
        }
    }
}
```

Operation then continues by updating the contents of d with the contents of dp, and performing the above iteration again.

After a first iteration, the distance array d contains all available paths of length 2 between any two given nodes using all available layers up to the layer specified in the first index of the array. Repeating the above loop with the original matrix w will update d to all available paths of length 3 between two nodes using all available layers up to the layer specified in the first index of the array. This process is continued until all paths have been reached, wherein the minimal value of d for any layer represents the minimal deadlock-free length that can be found between these two nodes. A helper matrix is maintained to store the running history of transitions which represents a minimal path obtained between the two nodes. In an alternative embodiment, the disclosed system may check every layer above the current level for possible transitions. However, this checking increases the complexity of the system significantly. Moreover, in an embodiment in which the disclosed system checks the layer immediately above for an available transition, a solution may be obtained that is near optimal.

In another embodiment of the disclosed system, at the end of each of the above iterations, the array w may be replaced with the distance array d. In this manner, the shortest paths of length less than or equal to 1 are connected together to form the shortest paths of length less than or equal to 2, then the shortest paths of length less than or equal to 2 are connected together to find the shortest paths of length less than or equal to 4, and so on, thus allowing the performance complexity of the system to be reduced.

Other embodiments of the disclosed system may be obtained through application of a parallel Dijkstra's shortest-path algorithm, wherein the priority-queue utilized in each shortest-path calculation is based upon a Fibonacci heap, and the neighbor nodes utilized for relaxation at each node are layered according to the accessible nodes of the corresponding tree or forest.

Whether or not the pseudo-code shown above succeeds in finding a path between every pair of nodes in the network depends on how the layers were chosen. In one embodiment of the disclosed system, at least one layer (for example, the first layer to be formed) is chosen so as to be a spanning subgraph (that is, a subgraph that is connected and contains every node of the network). This condition is sufficient to guarantee that the pseudo-code will identify a path for every pair of nodes in the network. Those skilled in the art will appreciate that other embodiments may choose layers in such a way that no layer is a spanning subgraph and yet so as to assure that a path will be found for every pair of nodes.

In an alternative embodiment, if a given layer is not loop-free, but nevertheless represents a deadlock-free set of paths, a deadlock-free set of paths using all layers may be determined as follows. First, assume there is a deadlock-free set of paths using n layers. Next, that deadlock-free set of paths may be extended across one more layer, where the new layer itself also has a deadlock-free set of paths, by the following process:

For each pair of nodes (A,B):
For each node C (where C is not A and C is not B):
check if the path from A to C (within the n layers) plus the path from C to B (within the new layer) is better than the path from A to B within the n layers, or any path found through any other node C' in this step. If so, replace the path from A to B by the path that goes from A to C (within the first n layers), concatenated with the path from C to B (within the new layer).

Figure 4:
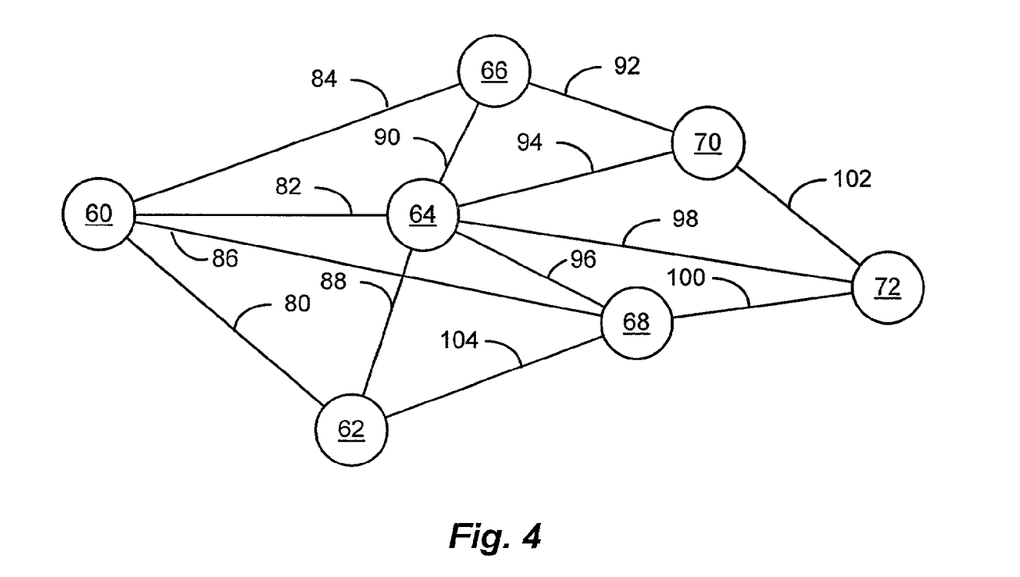
FIG. 4 shows a network including a number of nodes and links between nodes.

FIG. 4 shows an illustrative network for purposes of discussion that includes a number of nodes and links between nodes. The nodes shown in FIG. 4 may comprise any kind of networking devices, such as routers or switches. The links of FIG. 4 may be any kind of communications link, such as fiber optic, coax, or twisted pair cable, or virtual channels. As shown in FIG. 4, a set of nodes 60, 62, 64, 66, 68, 70, 72 are interconnected by a set of links 80, 82, 84, 86, 88, 90, 92, 94, 96, 98, 100, 102, and 104.

Figure 5:
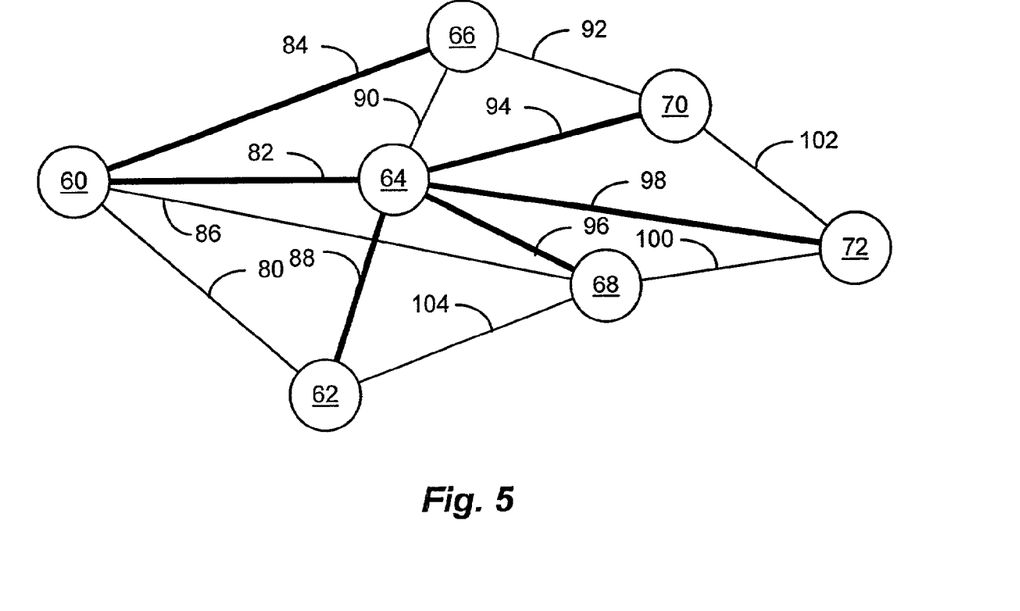
FIG. 5 shows an example of an initial deadlock-free sub-topology layer of the network shown in FIG. 4.
Figure 6:
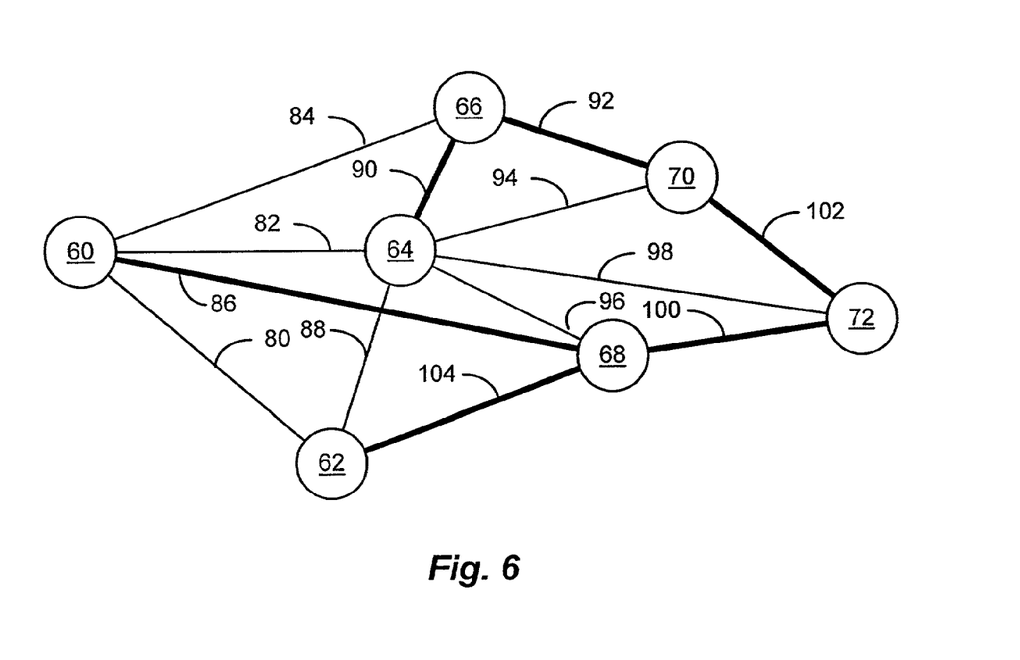
FIG. 6 shows an example of a second deadlock-free sub-topology layer of the network shown in FIG. 4.

FIG. 5 illustrates an initial layer formed by the disclosed system. The initial layer shown in FIG. 5 is a spanning tree for the network shown in FIG. 4, and includes the links 82, 84, 88, 94, 96 and 98. The layer shown in FIG. 5 is referred to as layer 1 with respect to the network shown in FIG. 4. FIG. 6 shows a second layer (layer 2), which is a spanning tree utilizing links from the network of FIG. 4 which were not used in the layer 1 as illustrated in FIG. 5. The layer 2 shown in FIG. 6 includes the links 86, 90, 92, 100, 102 and 104.

Figure 7:
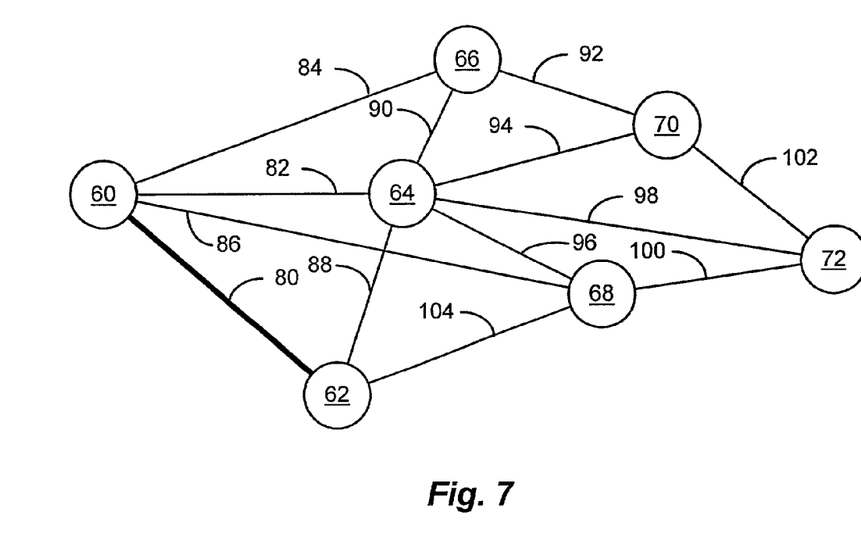
FIG. 7 shows an example of a third deadlock-free sub-topology layer of the network shown in FIG. 4.

FIG. 7 shows an example of a third deadlock-free layer with respect to the network shown in FIG. 4. As shown in FIG. 7, layer 3 includes the link 80, which is the only remaining link that is unused following the formation of the layers shown in FIGS. 5 and 6. Thus the layer shown in FIG. 7 is an example of a non-spanning tree layer, also referred to as a forest.

Figure 8:
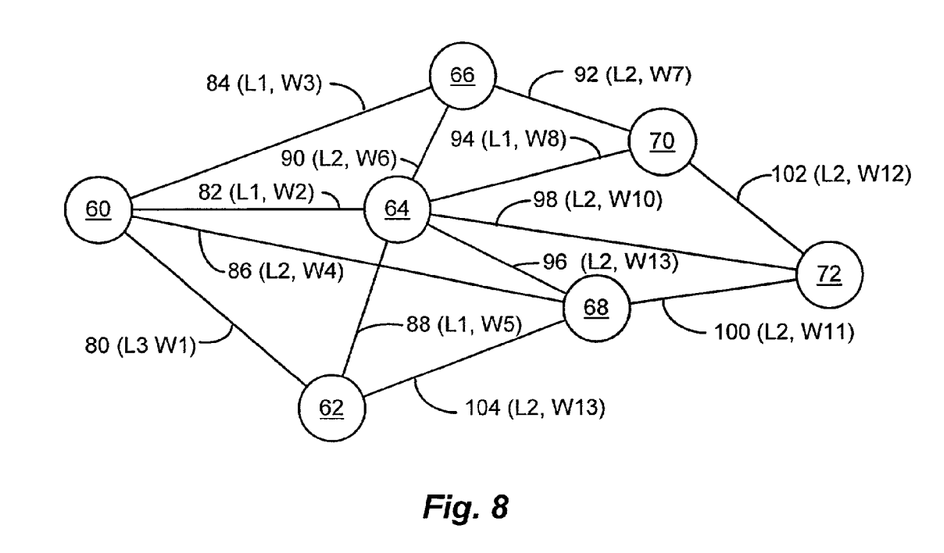
FIG. 8 shows the network of FIG. 4 with layer assignments associated with the links according to the layers shown in FIGS. 5–7.

FIG. 8 shows the network of FIG. 4 with layer assignments associated with the links according to the layers shown in FIGS. 5–7. As shown in FIG. 8, e.g., link 80 is associated with layer L3 and a weight W1 (L3, W1). The other links are similarly labeled.

In one embodiment of the disclosed system, the weights and layers shown associated with the links of the network in FIG. 8 may be used to determine the shortest paths between the nodes in the network. The weights associated with each link indicate a cost or distance associated with the link. Each path must only include links associated with a layer of an order at least as great as any preceding layer within the ordered set of layers generated by the disclosed system.

Those skilled in the art should readily appreciate that programs defining the functions of the disclosed system and method for determining a deadlock-free set of paths can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. In particular, while some of the illustrative embodiments are described in connection with the use of spanning trees, the disclosed system and method are also applicable to any other kind of sub-topology which contains no loops, and is accordingly deadlock-free. Accordingly, the invention should not be viewed as limited except by the scope and spirit of the appended claims.

What is claimed is:

1. A method of determining a deadlock-free path between first and second nodes in a network comprising links between a plurality of nodes, the method comprising: forming an ordered set of deadlock-free sub-topologies of the network, each sub-topology comprising links that are not used in any other sub-topology; assigning each sub-topology a unique layer identifier, the layer identifier assigned in a sequential order with respect to the order of the set; assigning each link the layer identifier of the respective sub-topology of which the link is a member; and selecting a plurality of links from the first node to the second node such that in traversing from a previous link to a next link a value of the layer identifier assigned to the next link is at least as great as a value of the layer identifier assigned to the previous link.

2. A method of determining a path between first and second nodes in a network comprising links between a plurality of nodes, the method comprising: forming a set of sub-topologies of the network, each sub-topology comprising links that are not used in any other sub-topology; ordering the set of sub-topologies in a first order; assigning each sub-topology a unique layer identifier, the layer identifier corresponding to the first order; assigning the layer identifier of the respective sub-topology to each link of the respective sub-topology; and determining the path by selecting a plurality of links from the first node to the second node such that, in traversing from a previous link to a next link along the path, a value of the layer identifier assigned to the next link is at least as great as a value of the layer identifier assigned to the previous link.

3. The method as recited in claim 2, wherein each sub-topology is deadlock-free.

4. The method as recited in claim 2, wherein the first order is different than an order in which the set of sub-topologies is formed.

5. The method as recited in claim 2, wherein at least one of the sub-topologies is a spanning tree.

6. A method of determining a path between first and second nodes in a network comprising links between a plurality of nodes, the method comprising: forming a set of sub-topologies of the network, each sub-topology comprising links that are not used in any other sub-topology; ordering the set of sub-topologies in a first order; and determining the path by selecting a plurality of links from the first node to the second node such that, in traversing from a previous link to a next link along the path, the next link is either in a same sub-topology as the previous link or the next link is in a subsequent sub-topology as a function of the first order of the set.

7. The method as recited in claim 6, further comprising: assigning each sub-topology a unique layer identifier, the layer identifier corresponding to the first order; and assigning the layer identifier of the respective sub-topology to each link of the respective sub-topology, wherein determining the path comprises determining that a value of the layer identifier assigned to the next link is at least as great as a value of the layer identifier assigned to the previous link.

8. The method as recited in claim 6, wherein each sub-topology is deadlock-free.

9. The method as recited in claim 6, wherein the first order is different than an order in which the set of sub-topologies is formed.

10. The method as recited in claim 6, wherein at least one of the sub-topologies is a spanning tree.

11. The method as recited in claim 6, wherein the first order is an order in which the set of sub-topologies is formed.

12. The method as recited in claim 6, wherein each sub-topology comprises two or more links.

13. A method of determining a path in a network comprising links between a plurality of nodes, the method comprising: forming a set of sub-topologies of the network, each sub-topology comprising links that are not used in any other sub-topology; ordering the set of sub-topologies in a first order; and determining the path by selecting a plurality of links such that, in traversing from a previous link to a next link, the next link is either in a same sub-topology as the previous link or the next link is in a subsequent sub-topology as a function of the first order of the set.

14. The method as recited in claim 13, further comprising: assigning each sub-topology a unique layer identifier, the layer identifier corresponding to the first order; and assigning the layer identifier of the respective sub-topology to each link of the respective sub-topology, wherein determining the path comprises determining that a value of the layer identifier assigned to the next link is at least as great as a value of the layer identifier assigned to the previous link.

15. The method as recited in claim 13, wherein each sub-topology is deadlock-free.

16. The method as recited in claim 13, wherein the first order is different than an order in which the set of sub-topologies is formed.

17. The method as recited in claim 13, wherein at least one of the sub-topologies is a spanning tree.

18. The method as recited in claim 13, wherein the first order is an order in which the set of sub-topologies is formed.

19. The method as recited in claim 13, wherein each sub-topology comprises two or more links.

20. The method as recited in claim 13, wherein the first order is circular.

21. A method of determining a path in a network comprising links between a plurality of nodes, the method comprising: forming a set of sub-topologies of the network, each sub-topology comprising links that are not used in any other sub-topology; assigning a layer identifier to each sub-topology; assigning the layer identifier to each link in the respective sub-topology; and determining the path by selecting a plurality of links as a function of the layer identifier.

22. The method as recited in claim 21, further comprising ordering the layer identifiers in a first order, and wherein determining the path comprises: traversing from a previous link to a next link, wherein the layer identifier of the next link is either the same as the layer identifier of the previous link or the layer identifier of the next link is subsequent to the layer identifier of the previous link as a function of the first order of the layer identifiers.

23. The method as recited in claim 22, wherein the first order is circular.

24. The method as recited in claim 22, wherein each sub-topology is deadlock-free.

25. The method as recited in claim 22, wherein the first order is different than an order in which the set of sub-topologies is formed.

26. The method as recited in claim 22, wherein at least one of the sub-topologies is a spanning tree.

27. The method as recited in claim 22, wherein the first order is an order in which the set of sub-topologies is formed.

28. The method as recited in claim 22, wherein each sub-topology comprises two or more links.

29. A data forwarding device, comprising: at least one processor; a memory communicably coupled to said processor; routing program code, stored in said memory for execution by said processor, said routing program code for determining at least one path through a network, wherein said network comprises links between a plurality of nodes, said routing program code comprising: program code for forming a set of sub-topologies of the network, each sub-topology comprising links that are not used in any other sub-topology; program code for assigning a layer identifier to each sub-topology; program code for assigning the layer identifier to each link in the respective sub-topology; and program code for determining the path by selecting a plurality of links as a function of the layer identifier.

30. A computer program product including a computer readable medium, said computer readable medium having a computer program stored thereon, said computer program for determining at least one path through a network, wherein said network comprises links between a plurality of nodes, said computer program comprising: program code for forming a set of sub-topologies of the network, each sub-topology comprising links that are not used in any other sub-topology; program code for assigning a layer identifier to each sub-topology; program code for assigning the layer identifier to each link in the respective sub-topology; and program code for determining the path by selecting a plurality of links as a function of the layer identifier.

31. A computer data signal embodied in a carrier wave, said computer data signal including a computer program, said computer program for determining at least one path through a network, wherein said network comprises links between a plurality of nodes, said computer program comprising: program code for forming a set of sub-topologies of the network, each sub-topology comprising links that are not used in any other sub-topology; program code for assigning a layer identifier to each sub-topology; program code for assigning the layer identifier to each link in the respective sub-topology; and program code for determining the path by selecting a plurality of links as a function of the layer identifier.

32. A system for determining at least one path through a network, comprising: means for forming a set of sub-topologies of the network, each sub-topology comprising links that are not used in any other sub-topology; means for assigning a layer identifier to each sub-topology; means for assigning the layer identifier to each link in the respective sub-topology; and means for determining the path by selecting a plurality of links as a function of the layer identifier.

33. A method for determining at least one path through a network, comprising: forming an ordered set of at least two layers, wherein each of said layers includes a sub-topology of said network based on unused links with respect to any other layers; and determining said at least one path through said network, wherein said determining includes selecting a plurality of links of said network, wherein said path traverses said plurality of links, and wherein each of said selected links is associated with one of said layers having a position in said ordered set of layers at least as great as any position of any layer associated with any previously selected link within said path.

34. The method of claim 33, wherein said forming said ordered set of layers further comprises forming each layer such that each of said sub-topologies included within each of said layers is deadlock-free.

35. The method of claim 34, wherein said forming of said ordered set of layers further comprises forming at least one spanning tree as at least one of said sub-topologies.

36. The method of claim 35, wherein said forming of said ordered set of layers further comprises forming at least one set of disconnected trees as at least one of said sub-topologies.

37. The method of claim 34, wherein said forming of said ordered set of layers further comprises forming at least one loop-free path using an up/down routing determination.

38. The method of claim 33, wherein at least one of said links within said network is a virtual channel.

39. The method of claim 33, wherein said determining said path comprises determining a lowest cost path between a first selected node and a second selected node.

40. The method of claim 33, wherein said determining said path comprises determining a shortest path between a first selected node and a second selected node.

41. A data forwarding device, comprising: at least one processor; a memory communicably coupled to said processor; routing program code, stored in said memory for execution by said processor, said routing program code for determining at least one path through a network, said routing program code comprising: program code for forming an ordered set of at least two layers, wherein each of said layers includes a sub-topology of said network based on unused links with respect to any other layers; and program code for determining said at least one path through said network, wherein said program code for determining includes program code for selecting a plurality of links of said network, wherein said path traverses said plurality of links, and wherein each of said selected links is associated with one of said layers having a position in said ordered set of layers at least as great as any position of any layer associated with any previously selected link within said path.

42. The data forwarding device of claim 41, wherein said program code for forming said ordered set of layers further comprises program code for forming each layer such that each of said sub-topologies included within each of said layers is deadlock-free.

43. The data forwarding device of claim 42, wherein said program code for forming of said ordered set of layers further comprises program code for forming at least one spanning tree as at least one of said sub-topologies.

44. The data forwarding device of claim 43, wherein said program code for forming of said ordered set of layers further comprises program code for forming at least one set of disconnected trees as at least one of said sub-topologies.

45. The data forwarding device of claim 42, wherein said program code for forming of said ordered set of layers further comprises program code for forming at least one loop-free path using an up/down routing determination.

46. The data forwarding device of claim 41, wherein at least one of said links within said network is a virtual channel.

47. The data forwarding device of claim 41, wherein said program code for determining said path comprises program code for determining a lowest cost path between a first selected node and a second selected node.

48. The data forwarding device of claim 41, wherein said program code for determining said path comprises program code for determining a shortest path between a first selected node and a second selected node.

49. A computer program product including a computer readable medium, said computer readable medium having a computer program stored thereon, said computer program for determining at least one path through a network, said computer program comprising: program code for forming an ordered set of at least two layers, wherein each of said layers includes a sub-topology of said network based on unused links with respect to any previous layers; and program code for determining said at least one path through said network, wherein said program code for determining includes program code for selecting a plurality of links of said network, wherein said path traverses said plurality of links, and wherein each of said selected links is associated with one of said layers having a position in said ordered set of layers at least as great as any position of any layer associated with any previously selected link within said path.

50. A computer data signal embodied in a carrier wave, said computer data signal including a computer program, said computer program for determining at least one path through a network, said computer program comprising: program code for forming an ordered set of at least two layers, wherein each of said layers includes a sub-topology of said network based on unused links with respect to any previous layers; and program code for determining said at least one path through said network, wherein said program code for determining includes program code for selecting a plurality of links of said network, wherein said path traverses said plurality of links, and wherein each of said selected links is associated with one of said layers having a position in said ordered set of layers at least as great as any position of any layer associated with any previously selected link within said path.

51. A system for determining at least one path through a network, comprising: means for forming an ordered set of at least two layers, wherein each of said layers includes a sub-topology of said network based on unused links with respect to any previous layers; and means for determining said at least one path through said network, wherein said determining includes selecting a plurality of links of said network, wherein said path traverses said plurality of links, and wherein each of said selected links is associated with one of said layers having a position in said ordered set of layers at least as great as any position of any layer associated with any previously selected link within said path.

* * * * *